(12) United States Patent
Tu et al.

(10) Patent No.: US 7,574,067 B2
(45) Date of Patent: Aug. 11, 2009

(54) SURFACE RECONSTRUCTION AND REGISTRATION WITH A HELMHOLTZ RECIPROCAL IMAGE PAIR

(75) Inventors: Peter Henry Tu, Schenectady, NY (US); James Vradenburg Miller, Clifton Park, NY (US); Paulo Ricardo Mendonca, Clifton Park, NY (US); James Chapman Ross, Albany, NY (US)

(73) Assignee: General Electric Company, Niskayuna, NY (US)

( * ) Notice: Subject to any disclaimer, the term of this patent is extended or adjusted under 35 U.S.C. 154(b) by 758 days.

(21) Appl. No.: 10/678,244

(22) Filed: Oct. 3, 2003

(65) Prior Publication Data

US 2005/0074162 A1   Apr. 7, 2005

(51) Int. Cl.
G06K 9/40 (2006.01)
G06K 9/00 (2006.01)

(52) U.S. Cl. ...................... 382/254; 382/154
(58) Field of Classification Search .......... 382/154, 382/254
See application file for complete search history.

(56) References Cited

U.S. PATENT DOCUMENTS 5,446,548 A * 8/1995 Gerig et al. ............... 356/620

5,835,241 A * 11/1998 Saund ....................... 358/488

OTHER PUBLICATIONS

Surface reconstruction via Helmholtz reciprocity with a single image pair Tu, P. Mendonca, P.R.S. GE Global Res. Center, Niskayuna, NY, USA; This paper appears in: Computer Vision and Pattern Recognition, 2003. Proceedings. 2003 IEEE Computer Society Conference on Publication Date: Jun. 18-20, 2003 vol. 1, On pp. I-541-I-547 vol. 1.*

M. D. R. Babu, C.-H. Lee, and A. Rosenfeld. Determining plane orientation from specular reflectance. Pattern Recognition, 18(1):53-62, Jan. 1985.

H. H. Baker and T.O. Binford. Depth from edge and intensity based stereo. In Proc. of the 7th Intern. Joint Conference on Artificial Intell., pp. 631-636, Aug. 1981.

(Continued)

*Primary Examiner*—Bhavesh M Mehta
*Assistant Examiner*—Hadi Akhavannik
(74) *Attorney, Agent, or Firm*—Patrick K. Patnode

(57) ABSTRACT

A method of image reconstruction comprising: obtaining a Helmholtz reciprocal pair of images of an object, the images comprising a first image and a corresponding reciprocal image; determining an imaging geometry associated with the obtaining; selecting a plurality of points in the first image and identifying corresponding candidate points in the corresponding reciprocal image; matching a selected point of the plurality of points and a candidate point of the corresponding candidate points. A method of image registration with an object comprising: obtaining a Helmholtz reciprocal pair of images of an object, the Helmholtz reciprocal pair of images comprising a first image and a corresponding reciprocal image; estimating a pose for the object; predicting an estimated image corresponding to the pose and one image of the reciprocal pair of images; comparing the estimated image with a corresponding actual image from the pair of images; and refining the estimating a pose based on the comparing.

33 Claims, 11 Drawing Sheets

OTHER PUBLICATIONS

H. Gouraud. Continuous shading of curved surfaces. IEEE Trans. on Comput., 20(6):623-629, Jun. 1971.

B. K. P. Horn, Obtaining shape from shading Information. In P.H. Winston, editor, The Psychology of Computer Vision, pp. 115-1 55. McGraw-Hill, New York, 1975.

B. K. P. Horn. Understanding image intensities. Artificial Intelligence, 8(2):201-231, Apr. 1977.

B. K. P. Horn and M. J. Brooks, editors. Shape from Shading. Artificial Intelligence Series. MIT Press, Massachusetts, USA, 1989.

B. K. P. Horn, R. J. Woodham, and W. M. Silver. Determining shape and reflectance using multiple images. Technical Report 490, MIT, Massachusetts, USA, Aug. 1978.

J. J. Koenderink and A. J. van Doom. Geometrical modes as a general method to treat diffuse interreflections in radiometry. J. Opt. Soc. America, 73(6):843-850, Jun. 1983.

S. Magda, D. J. Kriegman, T. E. Zickler, and P. N. Belhumeur. Beyond lambert: Reconstructing surfaces with arbitrary BRDFs. In Proc. 8th Int. Conf. on Computer Vision, vol. II, pp. 391-398, Vancouver, Canada, Jul. 2001.

S. K. Nayar, K. Ikeuchi, and T. Kanade. Shape from inter-reflections. Int. Journal of Computer Vision, 6(3): 173-195, Aug. 1991.

F. E. Nicodemus. Radiometry, vol. IV of Applied Optics and Optical Engineering. Academic Press, New York, 1967.

Y. Ohta and T. Kanade. Stereo by intra- and inter-scan line search using dynamic programming. IEEE Trans. Pattern Analysis and Machine Intell., 7(2):139-154, Mar. 1985.

M. Oren and S. Nayar. Generalization of the lambertian model and implications for machine vision. Int. Journal of Computer Vision, 14(3):227-251, Apr. 1995.

M. Oren and S. K. Nayar. A theory of specular surface geometry. Int. Journal of Computer Vision, 24(2):105-124, Sep. 1996.

B. T. Phong. Illumination for computer-generated pictures. Comm. of the ACM, 18(6):311-317, Jun. 1975.

J. W. S. B. Rayleigh. On the law of reciprocity in diffuse reflection. Philosophical Magazine, 49:324-325, 1900.

W. C. Snyder. Structured surface BRDF reciprocity: Theory and counterexamples. Applied Optics, 41(21):4307-4313, Jul. 2002.

P. Thrift and C-H. Lee. Using highlights to constrain object size and location. IEEE Trans. Sys., Man and Cybern., 13:426-431, 1983.

H. von Helmholtz. Treatise on Physiological Optics. Dover, New York, 1925. Translated from the 1856 German edition.

T. Wada, H. Ukida, and T. Matsuyama. Shape from shading with interreflections under a proximal light-source: Distortion-free copying of an unfolded book. Int. Journal of Computer Vision, 24(2) 125-1 35, Sep. 1997.

Y. Weiss. Deriving intrinsic images from image sequences. In Proc. 8th Int. Conf. on Computer Vision, vol. II, pp. 68-75, Vancouver, Canada, Jul. 2001.

R. J. Woodham. Reflectance Map Techniques for Analyzing Surface Defects in Metal Castings. PhD thesis, MIT, Massachusetts, USA, Sep. 1977.

R. J. Woodham. Photometric stereo. Technical Report 479, MIT, Massachusetts, USA, Jun. 1978.

R. J. Woodham. Photometric method for determining surface orientation from multiple images. Optical Engineering, 19(1):139-144, Jan./Feb. 1980.

T. Zickler, P. N. Belhumeur, and D. J. Kriegman. Helntholtz stereopsis: Exploiting reciprocity for surface reconstruction. In A. Heyden, S. G., M. Nielsen, and P. Johansen, editors, Proc. 7th European Conf. on Computer Vision, vol. 3 of Lecture Notes in Computer Science 2352, pp. 869-884, Copenhagen, Denmark, May 2002.

Tu et al.; Surface Reconstruction Via Helmholtz Reciprocity with a Single Image Pair; Proceedings 2003 IEEE Conference on Computer Vision and Pattern Recognition. CVPR 2003; Madison, WI, Jun. 18-20, 2003, vol. 2 of 2; Jun. 18, 2003; pp. 541-547.

Zickler et al.; "Toward a Stratification of Helmholtz Stereopsis"; Proceedings 2003 IEEE Conference on Computer Vision and Pattern Recognition; CVPR 2003: Madison, WI, Jun. 18-20, 2003: vol. 2 of 2; pp. 548-555.

Viola et al.; "Alignment by Maximization of Mutual Information"; International Journal of Computer Vision; Kluwer Academic Publishers, Norwell, US; vol. 24, No. 2; Sep. 1997; pp. 137-154.

Maurer et al.; "Registration of 3-D Images Using Weighted Geometrical Features"; I EEE Transactions on Medical Imaging, IEEE Service Center, Piscataway, NJ, US; vol. 15, n. 6, Dec. 1996; pp. 836-849.

Zickler et al.; "Helmoholtz Stereopsis Exploiting Reciprocity for Surface Reconstruction"; International Journal of Computer Vision, vol. 49, No. 2-3, Sep. 2002; pp. 215-227.

Tu et al.; "Surface Registration with a Helmoholtz Reciprocity Image Pair"; IEEE Workshop on color and Photometric Methods in Computer Vision; Online; Oct. 12, 2003; URL:http://lear.inrialpes.fr/people/triggs/events/iccv03/cdrom/cpmcv03/32_tu.pdf.

* cited by examiner

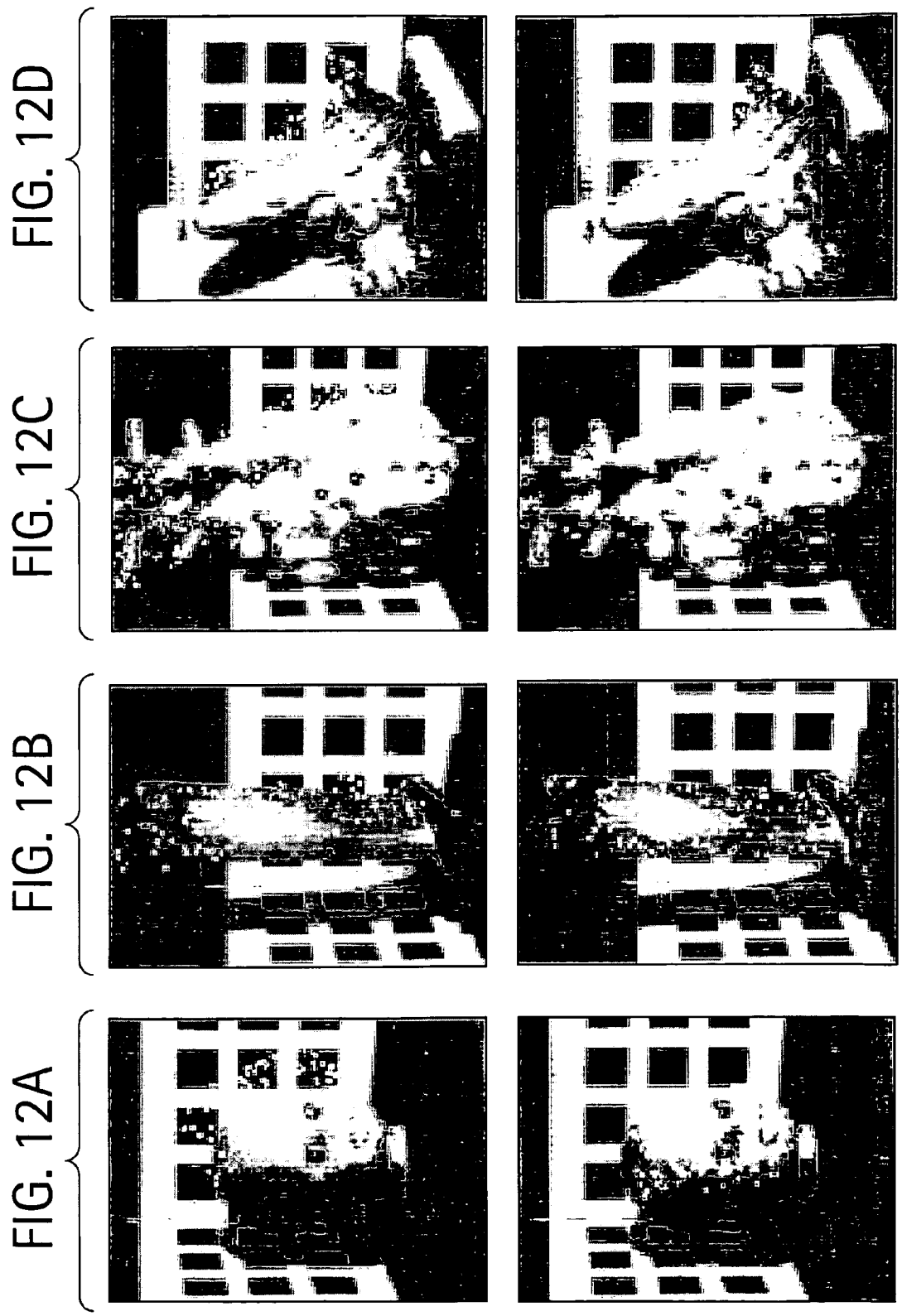

SURFACE RECONSTRUCTION AND REGISTRATION WITH A HELMHOLTZ RECIPROCAL IMAGE PAIR

BACKGROUND OF THE INVENTION

Image Reconstruction

The problem of reconstructing or determining a shape from shading has received significant attention from the computer vision community. Determining monocular shape from shading using multiple images has culminated in numerous practical systems for consumer applications. This progress was made possible by developments in many associated fields such as determining shape from specularities, shape from interreflections, reflectance modeling and extraction.

Recently there has been in the art successful uses of Helmholtz reciprocity in stereo reconstruction. This principle determines that the bi-directional reflectance distribution function (BRDF) of a surface is symmetric on the incoming and outgoing angles. The original statement by von Helmholtz referred only to specular reflections. A more general result was later stated by Lord Rayleigh. It is interesting to note that, for generic surfaces, the derivation of the Helmholtz reciprocity principle from basic physics has been established only recently.

By swapping the positions of a camera and a light source, the principle of Helmholtz reciprocity can be exploited to recover the shape of surfaces with arbitrary BRDFs. Currently, multiple Helmholtz pairs are required to obtain satisfactory image reconstruction results.

Thus, what is needed in the art is a reconstruction algorithm for continuous surfaces that makes use of Helmholtz reciprocity without resorting to multiple image pairs.

Image Registration

In many applications, a known 3D surface model needs to be aligned with a corresponding object's location in space. When the object is arbitrarily placed before a set of cameras, the model can be registered with the imagery. In this way the pose of the object can be determined with respect to the cameras. One example of such a scenario is an industrial parts inspection system in which, a gauging system is used to align a CAD model of a known part with the imagery of a newly manufactured item. Image and model registration are also useful in the medical arena. For example, CT scans of patients are used to generate sets of iso-surfaces that are then aligned with images of the patients on an operating table. This is generally an initial step in image-guided surgery.

There are a number of approaches that have been used to accomplish surface-to-imagery registration. If range images in the coordinate system of the cameras can be generated, algorithms such as Iterative Closest Point (ICP) can be used. Range images can be acquired using various strategies such as textured light reconstruction or dense stereo reconstruction. Textured light techniques such as laser striping may require the object to be stationary for extended periods of time and can be confounded by various types of surface finishes (such as polished metal and fiberglass composites). Most dense stereo reconstruction algorithms rely on surface texture to establish image-to-image correspondences, however, not all objects to be imaged include surface texture.

An alternative approach is to view the 3D surface structure as a generative model for the resulting imagery. If an initial estimate of the object pose appears reasonable, gradient descent can be used to improve the pose estimate by minimizing the difference between the generated and observed images. By making simple assumptions regarding the source of illumination, the surface can be rendered into a given camera frame. In an earlier work, a model of surface topography and terrain reflectance was used to align satellite images. Others have shown that mutual information (MI) is a reasonable metric for measuring the difference between the generated and observed image. A stereo pair of images has been employed to generate the intensity values of one image based on the intensity values of another image. This is done by projecting each point on the surface into both images and transferring the intensity value found in the first image into the generated second image. Although this approach is more realistic than direct surface rendering, it is not exact, in that it assumes a Lambertian model for surface reflectance. Therefore, what is needed in the art is a more exact generative model based on Helmholtz reciprocity for image registration.

The above discussed and other features and advantages of the embodiments will be appreciated and understood by those skilled in the art from the following detailed description and drawings.

BRIEF DESCRIPTION OF THE INVENTION

Disclosed herein in an exemplary embodiment is a method of image reconstruction comprising: obtaining a Helmholtz reciprocal pair of images of an object, the Helmholtz reciprocal pair of images comprising a first image and a corresponding reciprocal image; determining an imaging geometry associated with the obtaining of the Helmholtz reciprocal pair of images; selecting a plurality of points in the first image and identifying corresponding candidate points in the corresponding reciprocal image; matching a selected point of the plurality of points and a candidate point of the corresponding candidate points.

Also disclosed herein in another exemplary embodiment is a method of image registration with an object comprising: obtaining a Helmholtz reciprocal pair of images of an object, the Helmholtz reciprocal pair of images comprising a first image and a corresponding reciprocal image; estimating a pose for the object; predicting an estimated image corresponding to the pose and one image of the reciprocal pair of images; comparing the estimated image with a corresponding actual image from the pair of images; and refining the estimating a pose based on the comparing.

Further disclosed herein in yet another exemplary embodiment is a storage medium encoded with a machine-readable computer program code, the code including instructions for causing a computer to implement the above-mentioned method for image reconstruction.

Also disclosed herein in an exemplary embodiment is a computer data signal comprising: the computer data signal comprising code configured to cause a processor to implement the abovementioned method for image reconstruction.

In yet another exemplary embodiment a system for image reconstruction is disclosed. The system comprising: a means for obtaining a Helmholtz reciprocal pair of images of an object, the Helmholtz reciprocal pair of images comprising a first image and a corresponding reciprocal image; a means for determining an imaging geometry associated with the obtaining of said Helmholtz reciprocal pair of images; a means for a plurality of points in the first image and identifying corresponding candidate points in the corresponding reciprocal image; and a means for matching a selected point of the plurality of points and a candidate point of said corresponding candidate points.

Disclosed herein in another exemplary embodiment is a storage medium encoded with a machine-readable computer program code, the code including instructions for causing a computer to implement the above-mentioned method for image registration with an object.

Disclosed herein in yet another exemplary embodiment is a computer data signal: the computer data signal comprising a code configured to cause a processor to implement the above-mentioned method for image registration with an object.

Finally, disclosed herein in another exemplary embodiment is a system for image registration with an object comprising: a means for obtaining a Helmholtz reciprocal pair of images of an object, said Helmholtz reciprocal pair of images comprising a first image and a corresponding reciprocal image; a means for estimating a pose for the object; a means for predicting an estimated image corresponding to the pose and one image of the reciprocal pair of images; a means for comparing the estimated image with a corresponding actual image from the pair of images; and a means for refining the estimating a pose based on the comparing.

BRIEF DESCRIPTION OF THE DRAWINGS

FIG. 12 depicts a point cloud distribution on several exemplary images depicting the optimization of the pose prediction for registration.

The present invention will now be described, by way of an example, with references to the accompanying drawings, wherein like elements are numbered alike in the several figures in which:

DETAILED DESCRIPTION OF THE INVENTION

Figure 1:
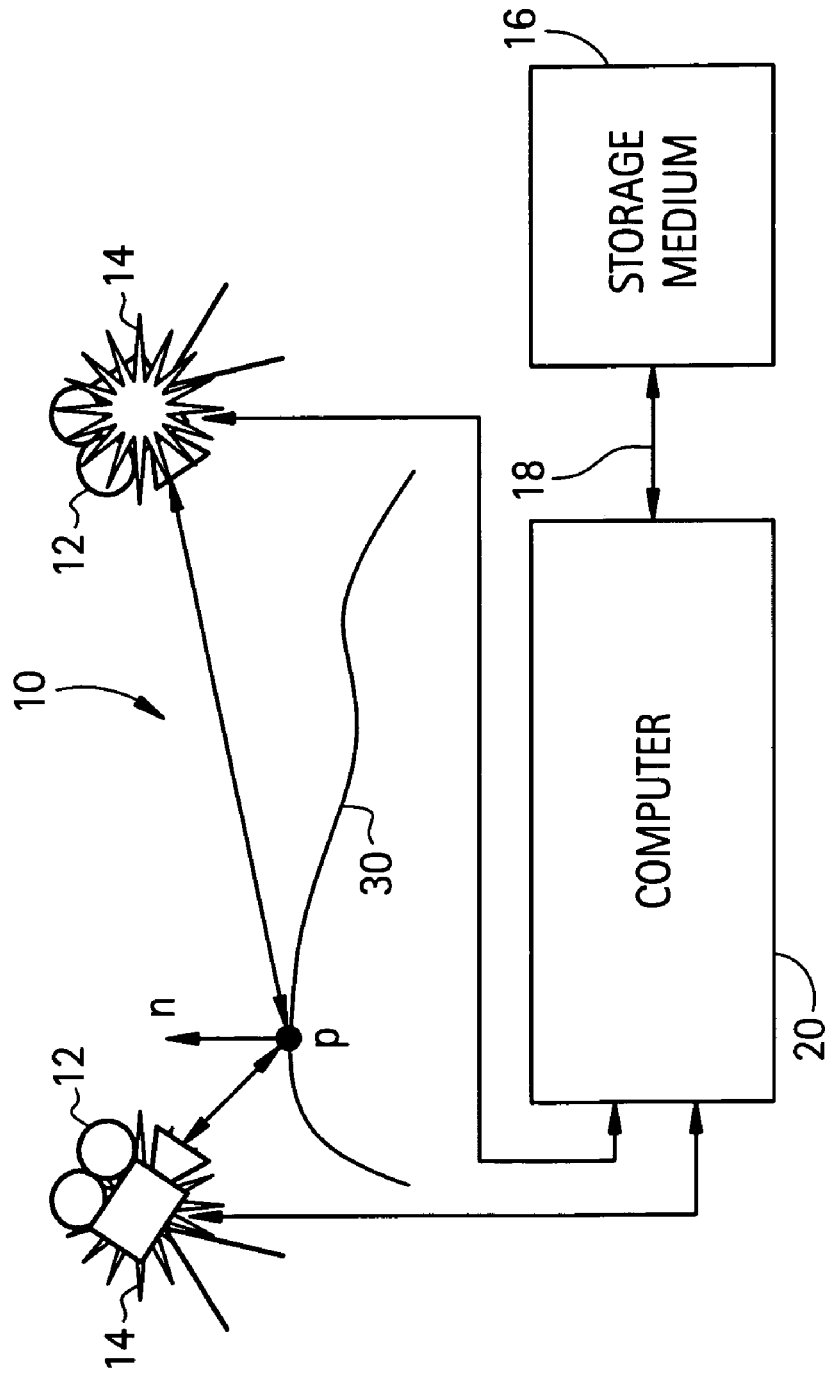
FIG. 1 depicts a simplified diagram of a system for capturing and reconstructing images in accordance with an exemplary embodiment.
Figure 2:
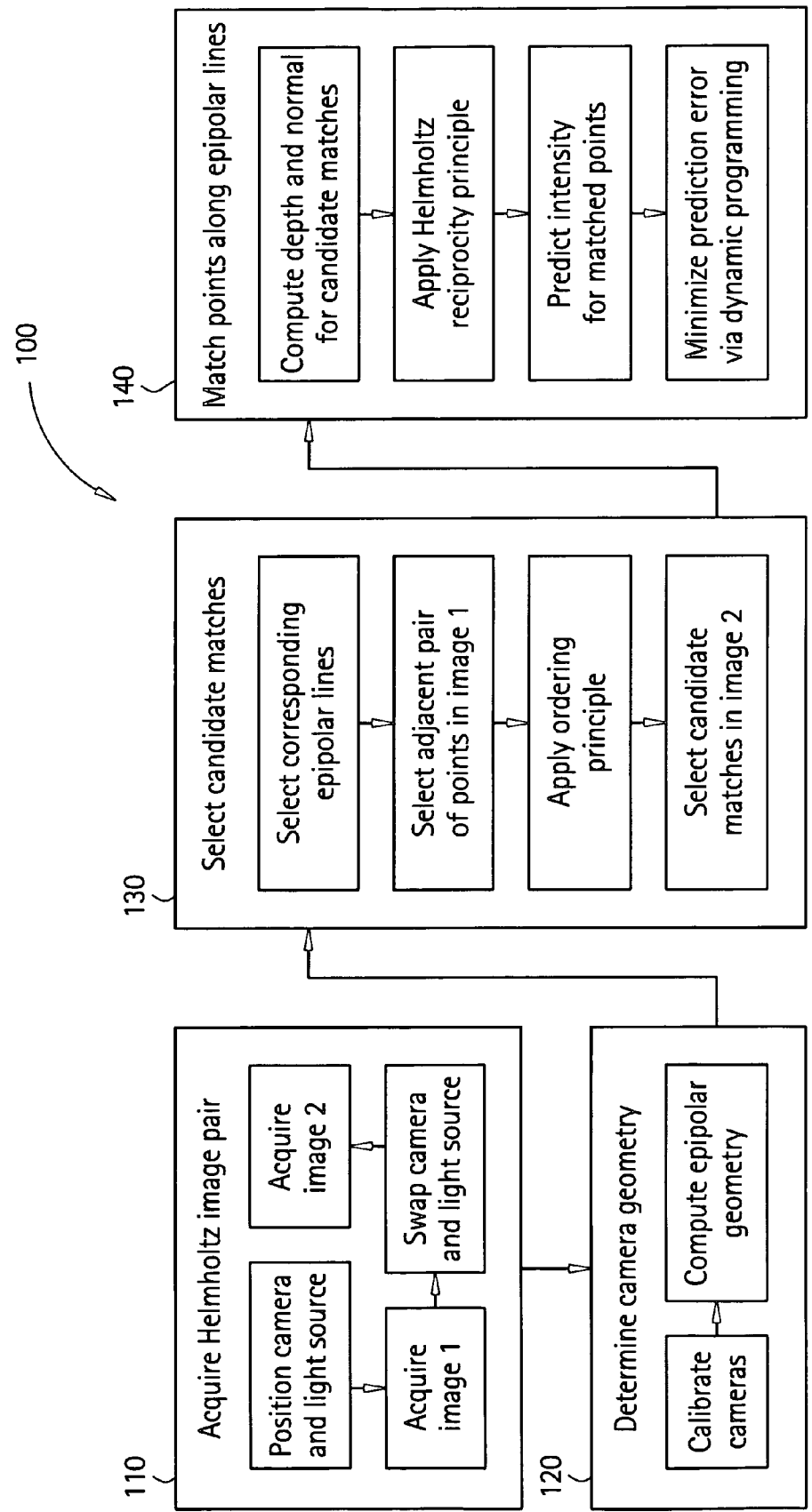
FIG. 2 depicts a simplified diagram depicting a methodology for reconstructing images in accordance with an exemplary embodiment.

Referring to FIGS. 1 and 2, disclosed herein is a method 100 and system 10 for three-dimensional reconstruction of surfaces that takes advantage of the symmetry resulting from alternating the positions of a receiver 12 e.g., a camera, and the like, herein after denoted as camera and a source 14, e.g. light source, lamp and the like hereinafter denoted as light source 14. This set up allows for the use of the Helmholtz reciprocity principle to recover the shape of and object 30 including smooth surfaces with arbitrary bi-directional reflectance distribution functions without requiring the presence of texture, as well as for exploiting mutual occlusions between images.

For a single image pair, the key idea is to approximate the intersection of a given epipolar plane and the surface with a piecewise linear curve. This formulation provides the local context needed to estimate the components of the surface normals that are contained in the epipolar plane so that for a given point on the surface, the intensity response in the first image can be predicted from the intensity response in the second image. A cost function based on the overall prediction error is established, and the optimal approximating polygon is found using dynamic programming. In addition, mechanisms for dealing with specularities, image saturation regions of high curvature, shadow and occlusions are described.

Similar to many traditional dense reconstruction algorithms, the methodology utilizes dynamic programming to find an optimal matching along epipolar lines. However, it does not require any unrealistic assumption about the BRDF of the scene, such as that it satisfies a Lambertian or Phong model. The matching is driven by the predictions of intensity values from one image to the other, which are then validated against direct image measurements. Advantageously, over the prior art, the methodology disclosed herein successfully employs as few as one reciprocal light/camera pair. Moreover, the methodology recovers surface depth and orientation simultaneously by determining a global minimum of an error function via dynamic programming. Advantageously, since the error is a function not just of depth but of surface orientation as well, the image reconstruction is subject to tighter geometric constraints than existing techniques, and as a result, fitting to local noise is avoided because it would induce a costly global deformation in the reconstruction.

In an exemplary embodiment, given a current estimate of surface geometry and intensity measurements in one image, Helmholtz reciprocity is used to predict the pixel intensity values of the second image of a reciprocal image pair. A dynamic program finds the reconstruction that minimizes the total difference between the predicted and measured intensity values. This approach allows for the reconstruction of surfaces displaying specularities and regions of high curvature, which is a challenge commonly encountered in the optical inspection of industrial parts.

It will be appreciated that Helmholtz reciprocity has been introduced into computer vision in the context of dense image reconstruction. Although dense reconstruction followed by an ICP algorithm can be implemented to facilitate registration, it may readily be observed that given one image of a Helmholtz stereo pair and the surface in the correct pose, the second Helmholtz image can be generated exactly. Thus, in an exemplary embodiment reconstruction followed by ICP may be avoided and replaced by an estimated pose and comparison of a predicted image with the actual image and optimizing the estimated pose based on the comparison.

Image Reconstruction

Continuing with the drawings, FIG. 2 depicts a simplified block diagram implementing a methodology 100 for reconstructing images in accordance with an exemplary embodiment. The methodology 100 initiates as depicted at process block 110 with acquiring a Helmholtz reciprocal image pair. The image pair may be instantly captured images, or stored images captured at some other time. In one exemplary embodiment, a camera 12 and light source 14 are positioned at known locations denoted optical centers relative to the object 30 and a first image is captured and stored. The camera 12 and light source 14 are then swapped and a second image is captured. In an exemplary embodiment a computer 20 and appropriate interfaces are utilized to facilitate the image capture, storage, and processing.

Continuing with FIG. 1 and the methodology 100, at process block 120, the geometry associated with the image capture is determined and an epipolar geometry is established. The geometry is based on the physical location of the camera 12 and light source 14 relative to the object 30. In an exemplary embodiment the geometry is established by calibrating the position and orientation of the camera 12 and light source 14 relative to the object 30. In addition an epipolar geometry based on the optical centers is computed. Turning now to process block 130, a plurality of points on the epipolar line in the first image are selected and a corresponding candidate points in the corresponding reciprocal image are identified. Corresponding epipolar lines in the corresponding reciprocal images are selected. On the epipolar lines, adjacent points in the first image are employed to establish matching points on the corresponding epipolar line in the second reciprocal image.

Finally, at process block 140 the points are matched along the corresponding epipolar lines. To perform the matching, the depths (distance from point p to an optical center $c_1$, $c_2$) and normals for given candidate matches are determined. The Helmholtz reciprocity principle is applied to facilitate prediction of intensity for matched points. The predicted intensity for a given point is compared with the measured intensity for the same point on the second reciprocal image and minimized via an iterative dynamic programming process to minimize the error in the prediction.

Figure 3:
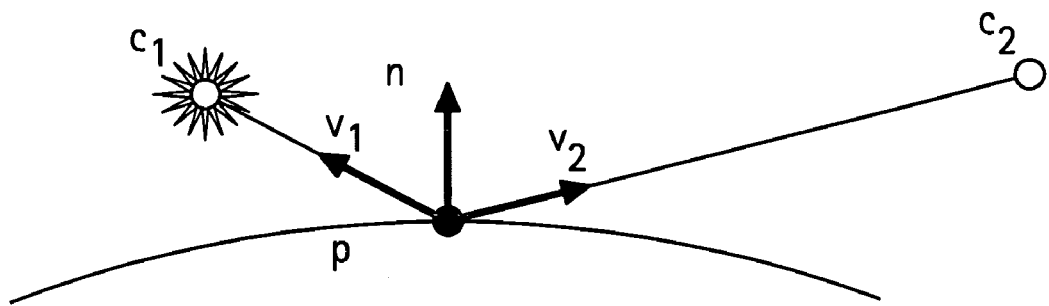
FIG. 3 provides a diagrammatic depiction of a Helmholtz reciprocity as applied in an exemplary embodiment.

To facilitate description of the disclosed embodiment, a summary of the mathematical background is provided. Referring now to FIG. 3 as well, the BRDF of a point p on a surface is defined, for a light ray at an incoming direction $v_1$, the ratio between the outgoing radiance at a direction $v_2$ and the radiance of the incoming light ray, and it is denoted by $\rho(p, v_1, v_2)$. Helmholtz reciprocity implies that $\rho(p, v_1, v_2) = \rho(p, v_2, v_1)$. Consider now a camera 12 and a point light source 14 arbitrarily positioned. Let $v_1$ be the unit vector pointing from p to the optical center $c_1$ of the camera 12, and $v_2$ the unit vector pointing from p to the location $c_2$ of the light source 14. The radiance $I_{1,2}$ received by the camera 12 from p will be given by equation (1):

$$I_{1,2}(p) = \eta \rho(p, v_1, v_2) n \cdot v_2 \frac{1}{\|c_2 - p\|^2}, \quad (1)$$

where n is the surface normal at p and $\eta$ is a scale factor. Similarly, if the positions of the camera 12 and the light source 14 are swapped, the new radiance $I_{2,1}$ received by the camera 12 will be $$I_{2,1}(p) = \eta \rho(p, v_1, v_2) n \cdot v_1 \frac{1}{\|c_1 - p\|^2}. \quad (2)$$

Substituting equation (1) into equation (2), given n and the measured intensity $I_{1,2}$, an estimate of the intensity of the corresponding pixel value in the other image may readily be computed as $$\hat{I}_{2,1} = I_{1,2} \frac{n \cdot v_1 \|c_2 - p\|^2}{n \cdot v_2 \|c_1 - p\|^2}. \quad (3)$$

It will be appreciated that equation (3), based on Helmholtz reciprocity is independent of the BRDF of the surface. Therefore, from equation (3) it can be seen that by acquiring a pair of images in which the positions of the camera 12 and the light source 14 are swapped (a reciprocal pair), the knowledge of the surface orientation and depth for a given point allows for any pixel intensity in one image to be predicted from the other image regardless of the BRDF of the surface.

Global Matching Via Intensity Prediction

Matching algorithms may be employed using dynamic programming to reconstruct the intersection of an epipolar plane and a continuous surface, producing a global matching of points in an epipolar line in one image against a corresponding epipolar line in another image. The basic idea is to create a grid where each column is associated with an image point on the epipolar line of the first image and each row is associated with an image point of the epipolar line in the second image. Each node in the graph represents a point in space that is defined by the intersection of the rays of the two image points. The rows and columns are ordered based on position along the epipolar lines so that a monotonically increasing path through the grid constitutes a valid reconstruction. This approach is known as satisfying an ordering constraint. Under the assumption of a Lambertian reflectance model, (e.g., a constant BRDF), the cost associated with a step from a node a to a node b is the cost at node a plus a normalized correlation error between an intensity window centered at the points associated with node b.

Figure 4:
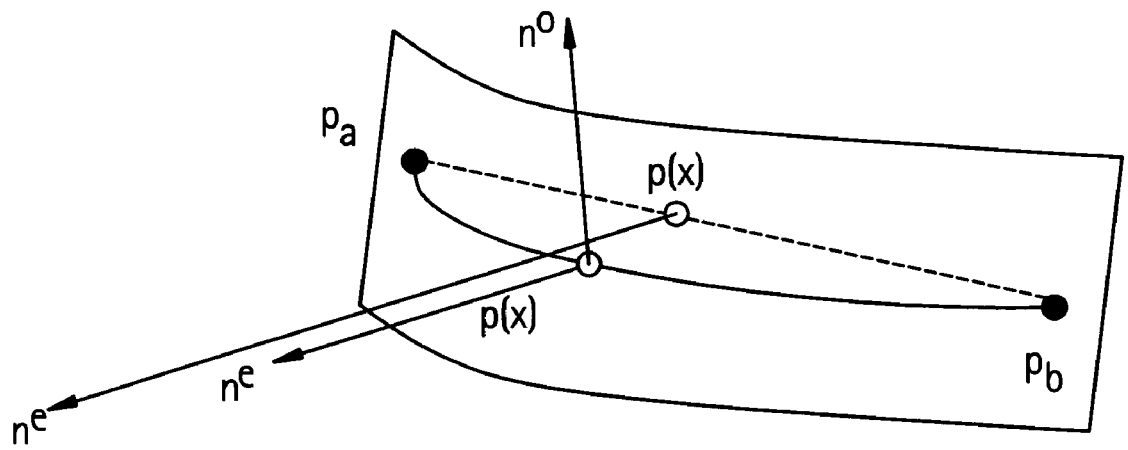
FIG. 4 provides a graphical illustration of dynamic programming and defining a cost function in accordance with an exemplary embodiment.

Referring now to FIG. 4 as well, Helmholtz reciprocity can be used to define a cost function C(a, b), where a and b are nodes from consecutive columns in the dynamic programming grid, that does not depend on the BRDF. The nodes a and b define two points in space $p_a$ and $p_b$. Points on the line segment between these two points are given by $$p(x) = x P_a + (1-x) p_b; \quad 0 \leq x \leq 1 \quad (4)$$

Assuming smoothness of the surface to be reconstructed, this line segment can be used to approximate the surface so that $$C(a, b) = \frac{\int_{x=0}^{x=1} C(x) dx}{\|p_a - p_b\|} \quad (5)$$

where $$C(x) = (I_{2,1}(p(x)) - \hat{I}_{2,1}(p(x)))^2, \quad (6)$$

is the cost associated with the point p(x), $\hat{I}_{2,1}$ is defined in equation 3 and $I_{2,1}$ is directly measured in the image.

Observe also that $\hat{I}_{2,1}$ depends on the surface normal n, which is not available a priori. Let $n = n^o + n^e$, where $n^e$ is the projection of the normal vector n on the epipolar plane, and $n^o$ is the projection of n on the direction orthogonal to the epipolar plane. The unit vectors $v_1$ and $v_2$ defined in the previous section are given by $$v_1 = \frac{c_1 - p(x)}{\|c_1 - p(x)\|} \text{ and } v_2 = \frac{c_2 - p(x)}{\|c_2 - p(x)\|}. \quad (7)$$

Since $v_1$ and $v_2$ are both in the epipolar plane, $$v_1 \cdot n \cdot = v_1 \cdot n^e \text{ and } v_2 \cdot n \cdot = v_2 \cdot n^e \quad (8)$$

and $n^e$ can be approximated, up to an unknown scale $\alpha$, as $$\hat{n}^e \approx \alpha \frac{(p_a - p_b) \times (v_1 \times v_2)}{\|(p_a - p_b) \times (v_1 \times v_2)\|}. \quad (9)$$

Although it would be preferable to use a higher order approximation, this would violate the conditions needed for the applicability of dynamic programming as a tool for optimizing the function in (5). Substituting (9) in (8) and then in (3), one obtains $$\hat{I}_{2,1}(p(x)) = I_{1,2}(p(x)) \frac{\hat{n}^e \cdot v_1 \|c_2 - p(x)\|^2}{\hat{n}^e \cdot v_2 \|c_1 - p(x)\|^2}. \quad (10)$$

Everything on the right hand side of equation (10) is either measured from capturing the second image, or derived from the camera geometry and the surface approximation defined by the points $p_a$ and $p_b$.

Figure 5:
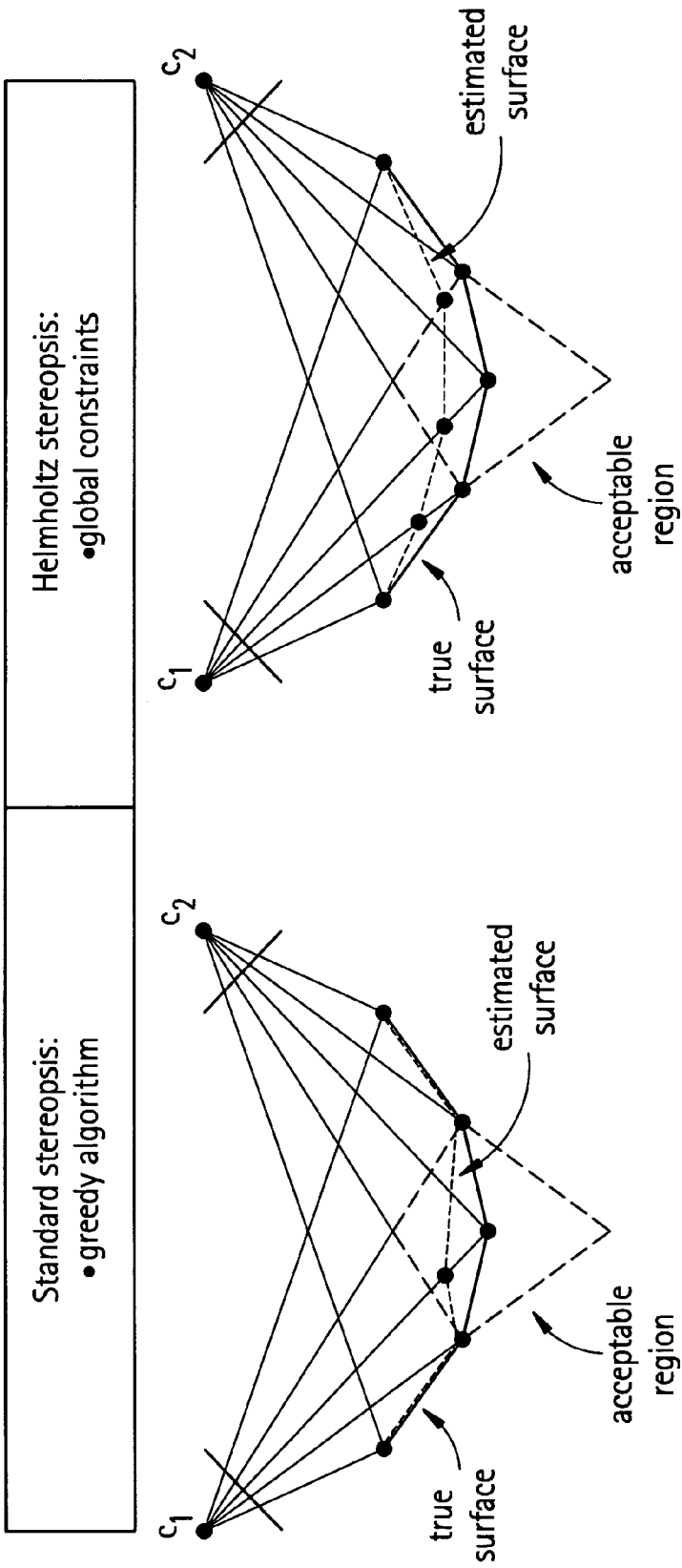
FIG. 5A provides a diagrammatic depiction of the impact of the ordering constraint.
FIG. 5B provides a diagrammatic depiction of the impact of the ordering constraint coupled with the Helmholtz stereopsis in accordance with an exemplary embodiment.

One important observation is that in the traditional approach to dense matching through dynamic programming the only effect previous matches have over future ones is by the enforcement of the ordering principle. This constraint limits the range of available matches. In the methodology disclosed herein in an exemplary embodiment, besides the constraint established from the ordering principle, the prior match will reflect on the value of the normal $n^e$, since it depends on both $p_b$ and $p_a$. It will be appreciated that this results in a stronger coupling of the matches and enforces geometric consistency, which places tighter constraints on the reconstruction. As a result, the technique presented herein should be less sensitive to local noise than existing methodologies. FIGS. 5A and 5B provide a diagrammatic depiction of the impact of the ordering constraint coupled with the Helmholtz stereopsis in accordance with an exemplary embodiment.

FIGS. 5A and 5B illustrate the fundamental difference between traditional correlation based matching versus the approach disclosed herein. Two cameras 12 with optical centers in $c_1$ and $c_2$ observe the surface shown as a solid black line. The acceptable region corresponds to the area for which the position of the midpoint on the surface does not violate the ordering constraint. If a perturbation is forced on this midpoint the rest of the reconstruction for the traditional approach is unchanged, as shown by the dashed line in FIG. 5A. Advantageously, with the methodology introduced herein this is not the case because the change in depth is coupled to the estimation of the surface normal, according to equation (10). This produces a global change in the rest of the reconstruction, as depicted in FIG. 5B, and a significant increase in the global cost function defined by equation (6). Consequently, the methodology introduced can be more resistant to perturbations induced by local noise.

Continuing with FIGS. 4 and 5B, in an exemplary embodiment, each column and row of a dynamic programming matrix represents a ray shot from the first and second camera 12, respectively. The column and row spacing define the distance between consecutive rays as they pierce their corresponding image planes. The reconstruction is then generated from the intersection of the row and column rays. The surface normals are calculated from line segments connecting points on consecutive column rays. In most dense matching applications that use dynamic programming, the row and column spacing are equally sampled. It will be appreciated that when the reconstruction is only concerned with depth equal sampling may be adequate. However, for an exemplary embodiment to ensure accurate approximation for surface normals, the column spacing should be set approximately 20 times greater than the row spacing. However, it will also be appreciated that the column and row spacing requirements have a direct impact on the execution time of the algorithm. The complexity of the dynamic program is $O(N_c N_r^2)$ where $N_c$ is the number of columns and $N_r$ is the number of rows. Since $N_r \approx 20 N_c$, a direct implementation of this methodology would require approximately 400 times the processing of a standard dense matching algorithm. Therefore, to address this issue, in another exemplary embodiment, a scale space approach has been adopted. Multiple iterations of dynamic program are performed. Initially, the row and column spacing are set to relatively large values resulting in a coarse reconstruction. Subsequent iterations use tighter row and column spacing, however the number of possible matches in the next reconstruction is limited to a neighborhood of the match obtained in the prior reconstruction such that $N_r$ is effectively 10 percent of its full value. For each iteration, this reduces the run time by a factor of 100. The process is continued until the desired resolution is achieved.

Figure 6:
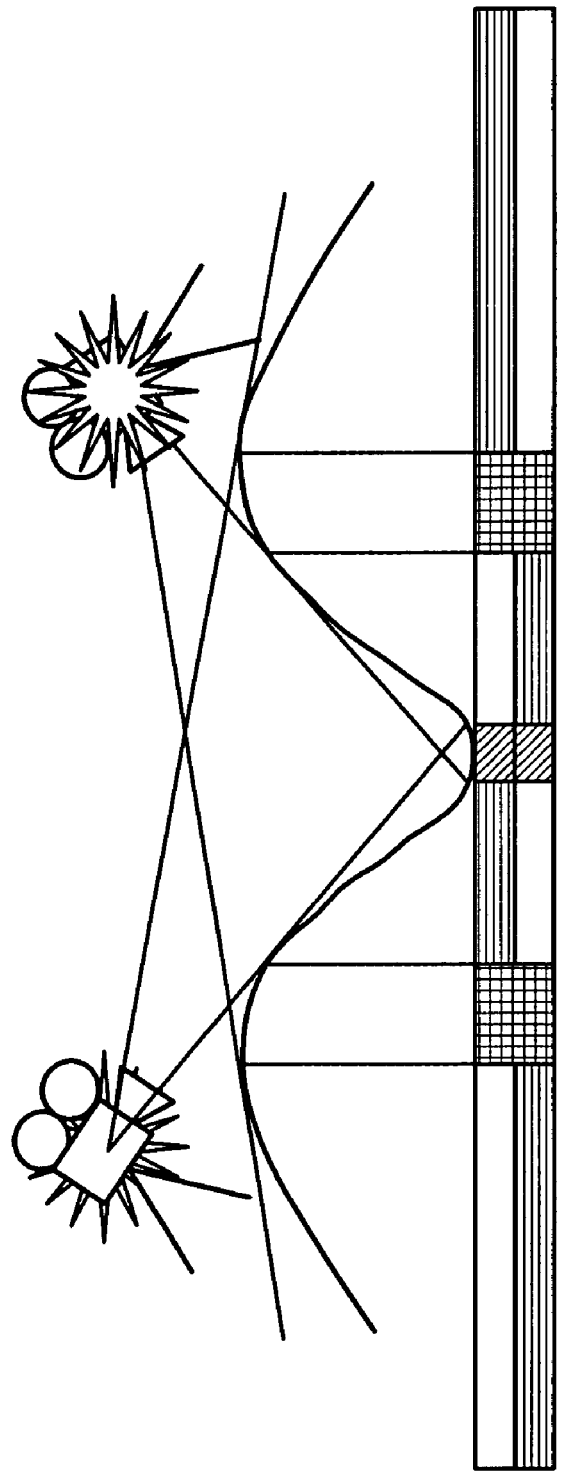
FIG. 6 provides a graphical representation of the simplification resulting from Helmholtz stereopsis on occlusions and shadows.

Turning to FIG. 6, a significant feature of the Helmholtz stereopsis and geometry is that any point, which is simultaneously visible and illuminated in one image, must also be visible and illuminated in the other image. The interchange of the camera 12 and light source 14 locations produces a mutual occlusion effect: an occluding contour in one image will correspond to a zone of shadow in the other image. With standard stereopsis, shadows and occlusions are independent. However, with Helmholtz stereopsis, shadows on one epipolar line in one image directly map as an occlusion on the corresponding epipolar line of the corresponding image and vice versa. Therefore, the matching of points along epipolar lines may be carried out as a dynamic programming problem along matching segments of the epipolar lines lying between an occluding contour and the beginning of a shadow, and the end points of the segments will already be in correspondence. More particularly, points that are classified as not visible, for not meeting an intensity threshold, are deleted from the dynamic programming matrix. Image points are then grouped into contiguous regions of visibility. If the image points in either image for a given pair of nodes a and b belong to different regions, the cost function C(a, b) is set to zero. In this way the continuity constraints are not enforced over regions where they do not apply. Advantageously, application of this principle leverages the effects of shadows and occlusions to further simplify the processing issues associated with the reconstruction and further enhance the robustness of the image reconstruction.

Figure 7:
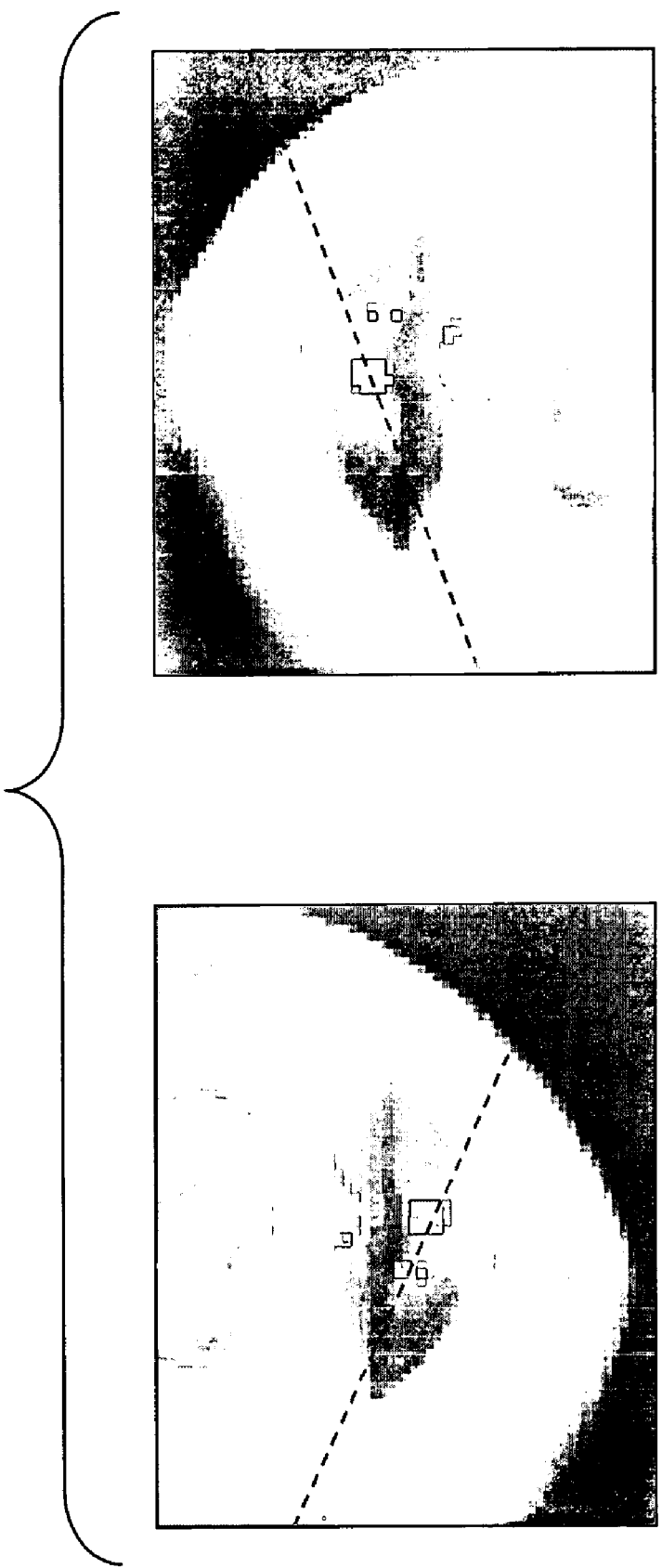
FIG. 7 depicts a Helmholtz image pair with a specularity and mapping along the epipolar lines.

Turning now to yet another feature of the disclosed exemplary embodiments, it will be appreciated that employing Helmholtz stereopsis, the difficulties previously associated with specularities, saturation and blooming may readily be mitigated. In particular, specularities have confounded traditional dense matching algorithms based on static illumination because the position of the specularity shifts depending on camera position. It should be appreciated, that this is not the case with Helmholtz reconstruction, because specularities are fixed in the surface to be reconstructed, as shown in FIG. 7, in fact, facilitating the matching of points along the epipolar lines.

However, due to limitations in camera dynamic range, it is likely that specularities will also produce image saturation (a limitation in the capability of a the camera), corrupting the intensity profile along the saturated region, and the cost function C(x) defined in equation (6) will be invalid. In this situation, a reasonable cost criteria may be re-defined based on the observation that, since both images show saturation, the sum $S(x)$ $I_1(x)^2 + I_2(x)^2$ is as large as possible. Making the approximation:

$$S(x) \approx \beta[(\hat{n}^e \cdot v_2)^2 + (\hat{n}^e \cdot v_1)^2] \tag{11}$$

where β is a constant if one assumes that the point p(x) is approximately equidistant from the two cameras, it can be shown that S(x) is maximal when $n^e$ bisects $v_1$ and $v_2$. This result is in agreement with the fact that specular reflections should occur only when the angles that the incident and reflected light make with the local surface normal are approximately the same. Thus, if the two projections of p(x) are saturated, the cost function C(x) previously defined in equation (6) is set to $$C(x) = (\hat{n}^e \cdot v_1 - \hat{n}^e \cdot v_2)^2. \tag{12}$$

Many industrial applications require measurements of surfaces with extremely high curvature. An example of this is the need to determine the position of a point on the leading edge of a fan blade where the radius of curvature is on the order of 0.01 inches. A Helmholtz stereopsis leading edge measurement system has been implemented and deployed on the factory floor. Comparison against standard Coordinate Measurement Machines result in an RMS reconstruction error on the order of 0.0012 inches.

Consider also the possibility of performing a dense reconstruction on high curvature regions. Since the surface normals along an epipolar plane change rapidly, the column and row spacing in the dynamic programming grid should preferably be maintained much smaller than a pixel.

A natural extension to this work is to use a parametric model of the surface to be reconstructed. In this case, the normal vectors could be directly extracted from the current estimate of the surface, and a global nonlinear optimization algorithm would be applied to the surface shape parameters to minimize the error in the prediction of the intensity values according to equation (10). Observe that that would significantly reduce the number of parameters to be optimized, but, since the estimation of the surface shape would have to be carried out by a nonlinear optimization technique, it would be necessary that a good initial estimate of the surface shape were available. Advantageously, the initial estimate could be provided by the non-parametric method previously described.

Image Registration

Figure 8:
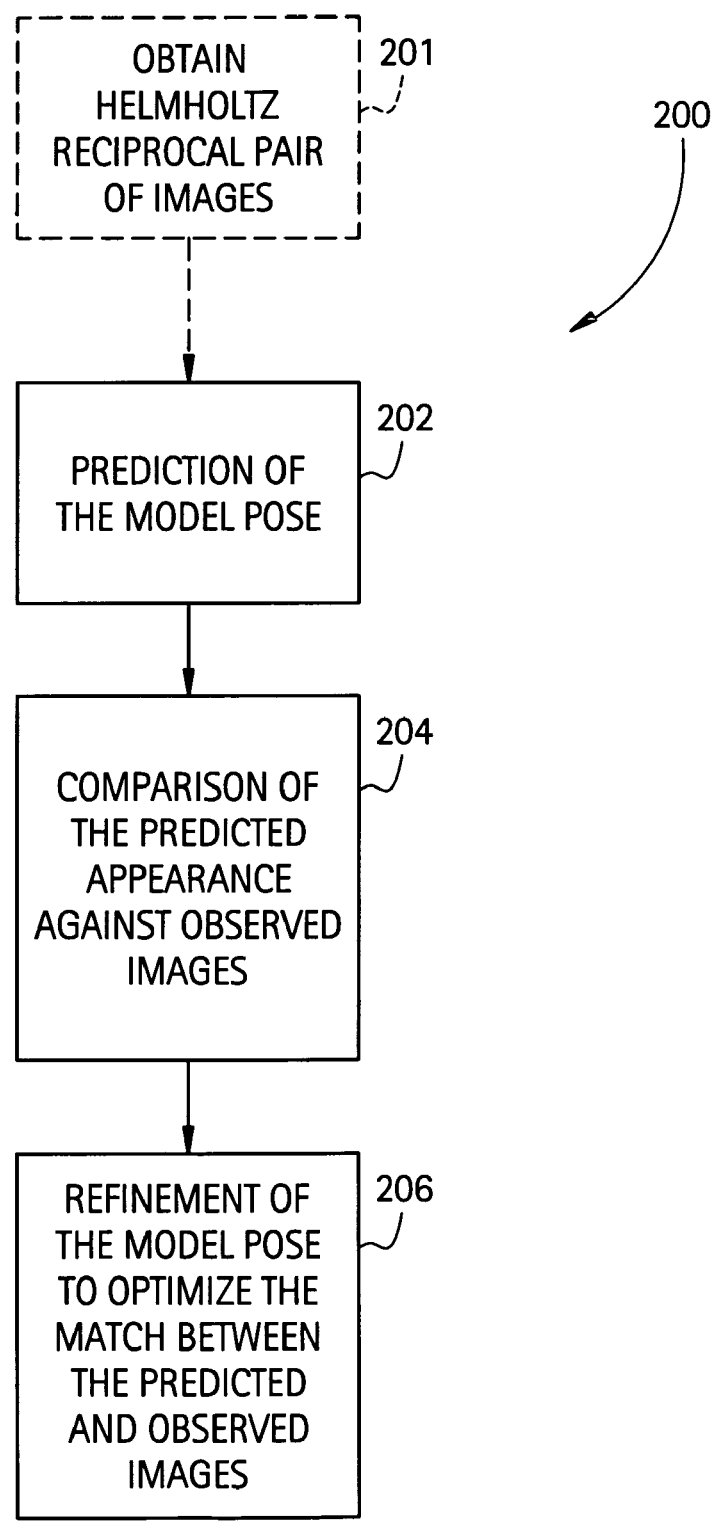
FIG. 8 is a flowchart depicting a registration methodology in accordance with another exemplary embodiment.

Disclosed herein in yet another exemplary embodiment, is a methodology for image/model registration. Referring now to FIG. 8, the methodology 200 may be summarized as three primary processes: prediction of the model appearance as depicted at process block 202; comparison of the predicted appearance against observed images as depicted at process block 204; and refinement of the model pose to optimize the match between the predicted and observed images as depicted at process block 206.

Helmholtz Prediction

Referring once again to FIGS. 1, 2, 3, and 8, given a three-dimensional (3D) point cloud model of an object 30, the Helmholtz configuration is used to generate a predicted image. Initially, a light source 14 is positioned at $c_2$, and a camera 12 at $c_1$ captures an image of the object 30. The positions of the camera 12 and light source 14 are then switched, and a second image is acquired to establish the previously mentioned Helmholtz reciprocal image pair as depicted at optional process block 201.

Next, the pose of the object model is estimated as depicted at process block 202. For a given model point p, the distances from the point to the camera centers $c_1$ and $c_2$ are computed. Additionally, the surface normal n at point p is determined. Advantageously, it should be appreciated that it is also possible, and computationally more efficient, to pre-compute the surface normals n at each point p. The viewing directions $v_1$ and $v_2$ associated to the camera centers $c_1$ and $c_2$ are computed. A ray is then projected from $c_1$ to p. The intensity of the pixel through which the ray passes is recorded as $I_{1,2}$. Finally, utilizing equation (3), $I_{2,1}$ is computed. This is the predicted intensity of the same data point as seen by the camera at $c_2$. This procedure is repeated for each data point in the model, generating a prediction of the image as seen from $c_2$. It is beneficial to observe that this prediction is in agreement with a complete modeling of the surface's BRDF, without requiring the BRDF to be explicitly measured.

Image Comparison and Metrics

Figure 9:
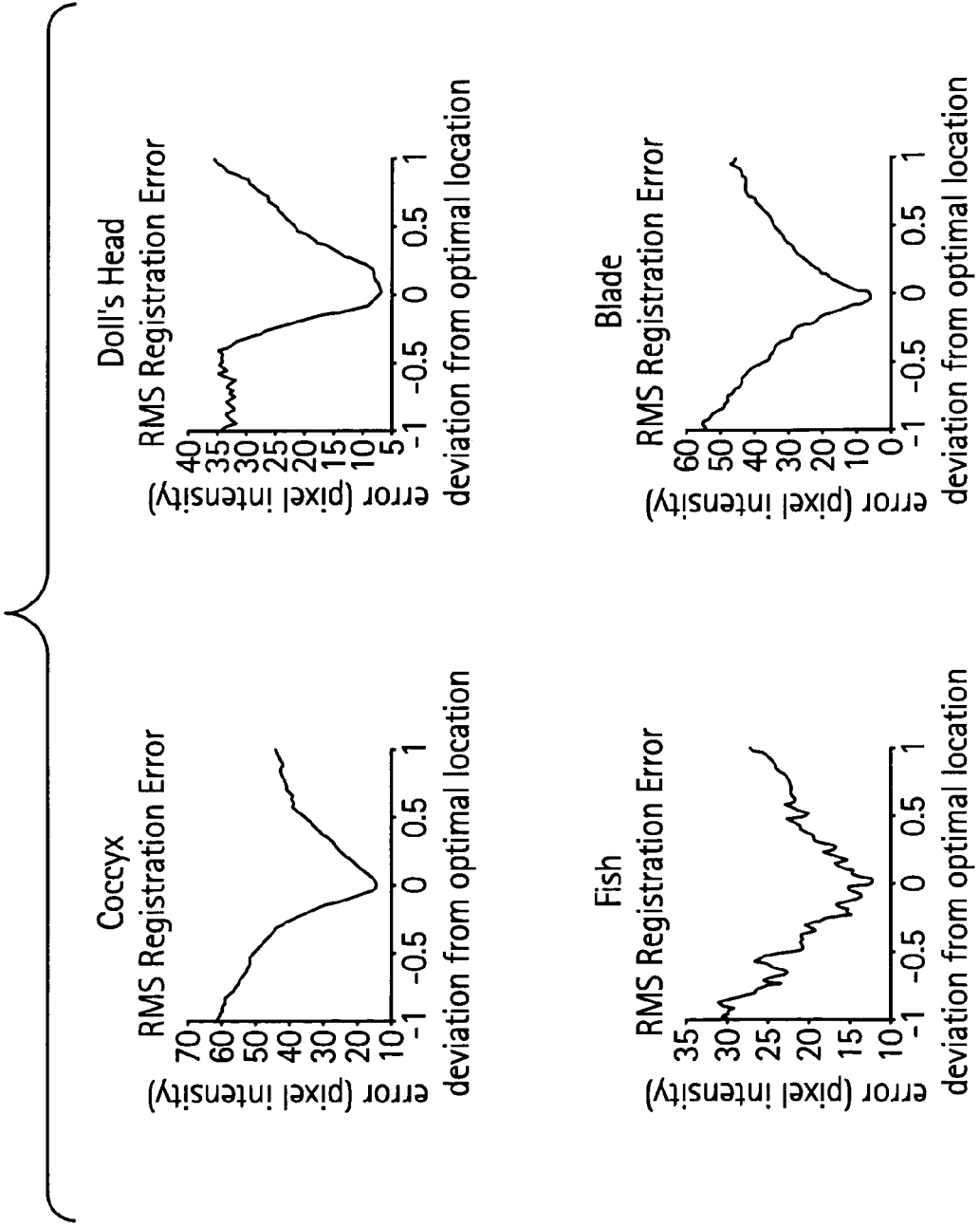
FIG. 9 depicts results with and $e_{RMS}$ metric for four different objects at different poses.

Continuing now with FIG. 8, at process block 204, the comparison of the predicted appearance against observed images may be based on one or more metrics. In an exemplary embodiment, several image comparison metrics as they relate to the Helmholtz generative paradigm are considered. It will readily be appreciated that the choice of an appropriate metric for image comparison may exert significant influence over registration convergence and accuracy. The most direct way to measure image dissimilarity is by the root mean square of pixel differences, $\varepsilon_{RMS}$, given by:

$$\varepsilon_{RMS} = \frac{1}{N} \sum_x \sum_y \sqrt{I_2(x,y) - \hat{I}_2(x,y))^2}, \tag{13}$$

where N is the number of pixels. FIG. 9 shows the value of this metric for four different objects at different poses, each of which has unique geometrical and textural properties. Position zero indicates perfect registration.

Let $t = [0\ 0\ 0]^T$ in centimeters and $\theta = [0\ 0\ 0]^T$ in degrees be vectors representing the correct pose of the objects. The plots in FIG. 9 show results of equation (13) when the pose of the object is perturbed in arbitrary translational and rotational directions, denoted by sΔt with ∥Δt∥=8 cm and sΔθ with ∥Δθ∥=14°, respectively, for different values of the parameter s, which measures how big the perturbed pose deviates from the optimal one. This corresponds to a one-dimensional slice of the full six-dimensional SE(3) manifold in which the pose parameters lie, and, therefore, cannot offer a full picture of the optimization landscape. However, it should be noted that on this slice at least the correct pose corresponds to the minimum of equation (13).

It is clear that any gradient-based optimization algorithm would have difficulties in converging to the true solution in the case of the fish data set. The fish data set is from a highly textured surface, with a background with the same material and colors as the foreground. This problem calls for a different type of similarity measure, such as the median of the square of the pixel differences, which should produce a metric $\varepsilon_{MS}$ more robust to image outliers $$\varepsilon_{MS} = \text{median}((I_2(x,y) - \hat{I}_2(x,y))^2 | x,y) \quad (14)$$

Figure 10:
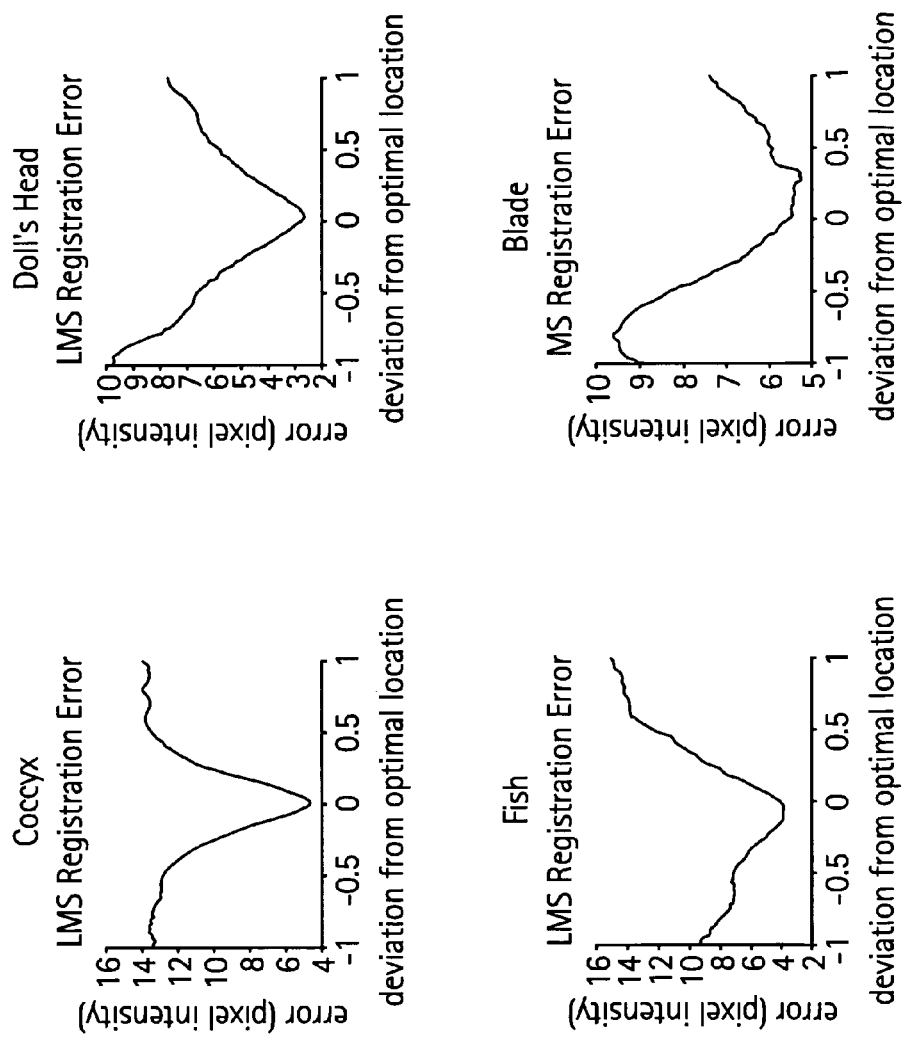
FIG. 10 depicts results with and $e_{MS}$ metric for four different objects at different poses.

FIG. 10 shows values of $\varepsilon_{MS}$ for the same four objects as in FIG. 9. Note that the cost curve for the blade has a minimum, which is displaced from the optimal alignment position. On the other hand, the $\varepsilon_{RMS}$ cost curve of the same object is quite smooth, and has a minimum very close to the position of optimal alignment. The model is perturbed from the optimal positioning the same way as used to produce the results in FIG. 9. It will be appreciated that, the shape of $\varepsilon_{MS}$ for this object may be because the blade is also almost textureless. These results suggest that registration should be performed using $\varepsilon_{RMS}$ when dealing with objects characterized by smooth, textureless surfaces, and $\varepsilon_{MS}$ is preferred for when highly textured surfaces are concerned.

Yet another metric may be employed that would depend on the spatial distribution of image intensities is the mutual information $\varepsilon_{MI}$, expressed as $$\varepsilon_{MI} = H[I_2] + H[\hat{I}_2] - H[I_2, \hat{I}_2] \quad (15)$$

where H[x] is the entropy of the random variable x.

Figure 11:
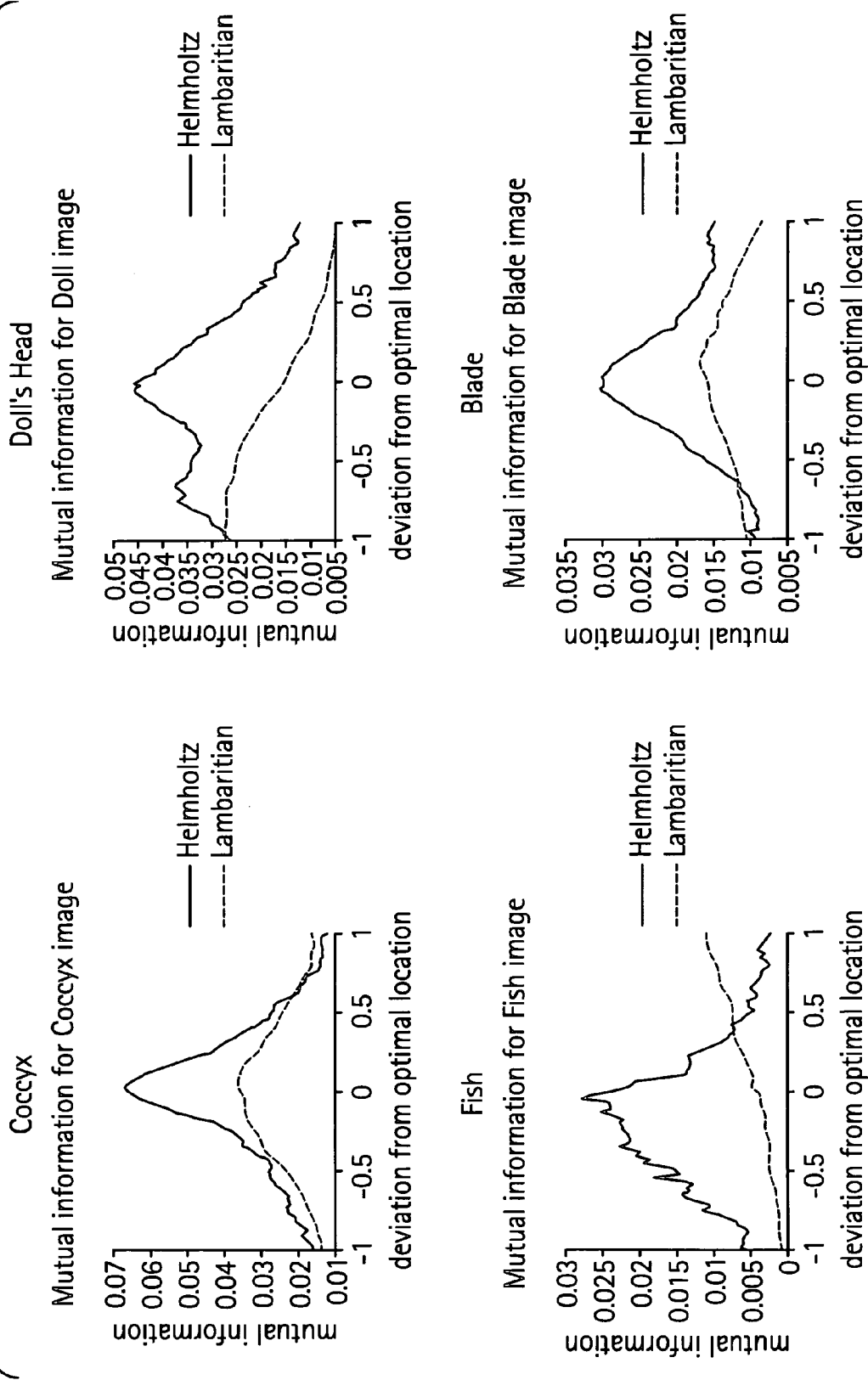
FIG. 11 depicts results with and $e_{MI}$ metric for four different objects at different poses.

FIG. 11 shows the mutual information between a predicted and actual image using both the Helmholtz generative approach and the Lambertian approximation scheme. In all cases, the methodology disclosed herein provides more information than a Lambertian model. Additionally, the Lambertian scheme fails to identify the correct model pose for some instances e.g., the fish and the doll's head, whereas the Helmholtz method succeeds in doing so for all four objects.

It will readily be appreciated that the choice of an appropriate metric for image comparison may exert significant influence over registration convergence and accuracy. The methods and results provided herein should be understood to be exemplary only to illustrate the effect of a selected metric. While the results provided suggest that registration should be performed using $\varepsilon_{RMS}$ when dealing with objects characterized by smooth, textureless surfaces, and $\varepsilon_{MS}$ is preferred for when highly textured surfaces are concerned, other metrics are possible. In fact, numerous methodologies may be employed for optimization of the estimate of the pose including, but not limited to, a gradient descent, Monte Carlo, an exhaustive search, and the like, as well as combinations including at least one of the foregoing.

Pose Optimization

Once a prediction of the model appearance is compared against an actual image, the difference between the two may be employed to drive an optimization algorithm to refine the pose of the model as depicted at process block 206 of FIG. 8. This can be carried out by optimizing any of the cost functions such as those illustrated in equations (13) or (15), where $\hat{I}_2(x, y)$, for all pixel coordinates (x, y), is a function of the same parameters R and t, corresponding to a rotation matrix and a translation vector with respect to the initial pose of the model. The dependency of $\hat{I}_2(x, y)$ on the orientation R and location t of the model is made explicit in equation (3), since p=p (R, t), n=n(R), and (x, y) are the coordinates of the projection of the point p, i.e., (x,y)=x=x(p). Therefore, the pose $(\hat{R}, \hat{t})$ of the model can be obtained as $$(\hat{R}, \hat{t}) = \underset{(R,t)}{\arg\max} \sum_p \left( I_2(x(p(R, t))) - \hat{I}_2 x(p)(R, t) \right)^2 \quad (16)$$

or $$(\hat{R}, \hat{t}) = \underset{(R,t)}{\arg\max} \; \underset{p}{\text{median}} \left\{ \left( I_2(x(p(R, t))) - \hat{I}_2 x(p)(R, t) \right)^2 \right\}. \quad (17)$$

In the examples shown in this work the optimization method adopted to solve (16) or (17) was conjugate gradient, with derivatives computed via finite differences, although many other options are possible.

To begin the optimization process it is necessary to have an initial estimation of the pose that is close enough to the true position so that the optimization algorithm will converge. For the registration of industrial parts it is usually the case that a good initial guess is readily available. For tracking applications, it is customary to postpone the initialization problem, and at every iteration, the current estimation of the pose provides an initial guess for the next iteration that should be close to the ground truth.

Because the Helmholtz reciprocity principle yields an exact generative model, there should be zero difference between the predicted and observed images given perfect alignment. Generally, there will be a discrepancy between the predicted image and the actual image as seen by the camera 12 at $c_2$. This is a result of model misalignment; which can be quantified using RMS (the root of mean squared differences), LMS (the median of squared differences), or MI (mutual information). With a properly chosen metric, conjugate gradient is used to update the model's transformation matrix. After the model is re-positioned in the scene, another predicted image is generated, and the cost of the current orientation is again computed. This series of steps is repeated until convergence is reached.

In order to validate the technique introduced here, a series of experiments was performed. A Helmholtz stereo pair was established by placing point light sources 14 as close as possible to the optical center of two identical cameras 12, but avoiding the lights from being occluded by the cameras themselves. Three images were acquired for four objects, one with the lights off, to measure ambient light; and two images for transposed lights 14 and cameras 12. The background image was then subtracted from each image in the Helmholtz pair to eliminate ambient light contributions. A 3D model for each object was obtained by sweeping the object with a laser stripe and performing stereo reconstruction. The 3D points of the model were then perturbed from they original position by a translation of 2.0 cm in each of the x, y and z directions, and by a rotation of 10° (degrees) around each of the x, y and z axes. It should be noted that this corresponds to a total translation of 6.9 cm and a rotation of 17.3°. Since the cameras 12 used in the 3D model reconstruction were the same used for the registration, without any change in position or parameters, optimal alignment is obtained with zero translation and rotation. The matrix R was represented through an exponential map, e.g., $R = \exp([w]_x)$, where $[w]_x$ is the anti-symmetric matrix built from the entries of w such that $[w]_x x = w \times x$ for all values of x. The direction of w is the axis around which the rotation is performed and the magnitude of w is the rotation angle. The algorithm described herein in accordance with an exemplary embodiment was employed, and good alignment (final translation of 2 mm and final rotation of 1°) using the median of the difference of pixel intensity as a metric was achieved for all data sets except for the fish, which had to be initialized with translations of 1.0 cm in the x y and z directions, as well as rotation of 3° around the x, y and z axes. This corresponds to a total translation of 1.7 cm and a rotation of 5.20. As a quick experiment to verify the robustness of the registration to the initial pose of the model, the initial translations and rotations applied to the models were multiplied by −1, and the registration algorithm was rerun. Again, convergence within 2 mm and 1° was obtained. FIG. 11 shows initial and final pose for each object. The difficulty in convergence for the fish model can be attributed to the cluttered background, which has the same texture as the fish itself, and to small size of this model.

The disclosed exemplary embodiments introduce a technique for registration of 3D models to 2D images based on Helmholtz reciprocity. By exploiting this principle the methodology facilitates prediction of the appearance of the back projected model in agreement with its BRDF without that having to explicitly know the BRDF. This is a great advantage over techniques, which assume a Lambertian model, valid only for certain types of surfaces. In particular, such algorithms are not capable of handling shinny of specular surfaces. After the appearance of the model has been predicted, a suitable image metric is used to quantify the discrepancy between predicted and observed images. Since the predicted image should be in agreement with the BRDF of the object, this discrepancy can be attributed to misalignment of the object 30, and it can therefore drive a search for optimal registration parameters. The effectiveness of this algorithm was demonstrated in a number of registration experiments with different objects, as well as by comparison with mutual information.

The disclosed invention can be embodied in the form of computer or controller 20 implemented processes and apparatuses for practicing those processes. The present invention can also be embodied in the form of computer program code containing instructions embodied in tangible media 16, such as floppy diskettes, CD-ROMs, hard drives, or any other computer-readable storage medium, wherein, when the computer program code is loaded into and executed by a computer or controller 20, the computer 20 becomes an apparatus for practicing the invention. The present invention can also be embodied in the form of computer program code embodied as a data signal 18, for example, whether stored in a storage medium 16, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A computer implemented method of image reconstruction comprising:
   obtaining a single Helmholtz reciprocal pair of images of an object, said single Helmholtz reciprocal pair of images comprising a first image and a corresponding reciprocal image captured from at least one of a first receiver and a second receiver;
   determining a geometry associated with said obtaining of said single Helmholtz reciprocal pair of images;
   selecting a plurality of points in said first image and identifying corresponding candidate points in said corresponding reciprocal image;
   matching a selected point of said plurality of points and a candidate point of said corresponding candidate points.

2. The method of claim 1 wherein said obtaining includes:
   capturing a first image of said image pair with the first receiver at a first optical center and a first source at a second optical center; and
   capturing a second image of said image pair with at least one of said first receiver and said second receiver at said second optical center, and at least one of said first source and a second source at said first optical center.

3. The method of claim 2 wherein at least one of said first receiver and said second receiver are cameras and at least one of said first source and said second source is a light source.

4. The method of claim 1 wherein said determining includes:
   establishing a position corresponding to a first optical center relative to said object;
   establishing a position corresponding to a second optical center relative to said object; and
   computing an epipolar geometry based on said first optical center and said second optical center.

5. The method of claim 1 wherein said selecting includes:
   selecting an epipolar line in said first image and a corresponding epipolar line in said corresponding reciprocal image based on an epipolar geometry;
   selecting an adjacent pair of points on said epipolar line in said first image of said reciprocal pair of images;
   applying an ordering principle based on said adjacent pair of points; and
   selecting a candidate matching point on said corresponding epipolar line in said corresponding reciprocal image.

6. The method of claim 1 wherein said matching includes:
   computing a depth and a normal for a candidate point in said corresponding reciprocal image;
   applying Helmholtz reciprocity;
   predicting an intensity for said candidate point, based on a measured intensity of said selected point in a first image; and
   comparing said predicted intensity with a measured intensity associated with said candidate point in said corresponding reciprocal image, forming an error based on said comparing:
   refining said predicting based on said error.

7. The method of claim 6 wherein said predicting is based on the equation:

$$\hat{I}_{2,1} = I_{1,2} \frac{n \cdot v_1 \|c_2 - p\|^2}{n \cdot v_2 \|c_1 - p\|^2}$$

where
- I1,2 denotes intensity measured at optical center c1 with source located at optical center c2;
- n·v1 denotes projection of the normal vector at point p in the direction of v1;
- $\|c_2-p\|$ denotes depth for optical center c2; and
- $\|c_1-p\|$ denotes depth for optical center c2.

8. The method of claim 6 wherein said predicting is in agreement with a BRDF associated with a point on said object corresponding to said selected point.

9. The method of claim 6 wherein said predicting is independent of a BRDF associated with a point on said object corresponding to said selected point.

10. The method of claim 6 wherein said predicting includes specularities in said reciprocal pair of images.

11. The method of claim 6 wherein said predicting includes leveraging effects of shadows and occlusions to enhance robustness of said predicting.

12. The method of claim 6 wherein said refining includes dynamic programming.

13. The method of claim 6 wherein said refining includes a global nonlinear optimization algorithm.

14. The method of claim 6 wherein said refining further includes establishing a parametric model and updating a parameter of said model.

15. The method of claim 6 wherein said refining is compensated to mitigate effects of saturation or blooming.

16. A computer implemented method of image registration with an object comprising:
- obtaining a single Helmholtz reciprocal pair of images of an object, said Helmholtz reciprocal pair of images comprising a first image and a corresponding reciprocal image captured from at least one of a first receiver and a second receiver;
- estimating a pose for said object;
- predicting an estimated image corresponding to said pose and one image of said reciprocal pair of images;
- comparing said estimated image with a corresponding actual image from said pair of images; and
- refining said estimating a pose based on said comparing.

17. The method of claim 16 wherein said obtaining includes:
- capturing a first image of said image pair with the first receiver at a first optical center and a first source at a second optical center; and
- capturing a second image of said image pair with at least one of said first receiver and the second receiver at said second optical center, and at least one of said first source and a second source at said first optical center.

18. The method of claim 17 wherein at least one of said first receiver or said second receiver are cameras and at least one of said first source and said second source is a light source.

19. The method of claim 16 wherein said estimating includes establishing an initial position and orientation in three-dimensional space for said object.

20. The method of claim 16 wherein said predicting includes:
- determining an intensity for a plurality of candidate points, based on a measured intensity of a corresponding plurality of selected points in a first image of said reciprocal pair of images.

21. The method of claim 20 wherein said predicting is based on the equation:

$$I_{2,1} = I_{1,2} \frac{n \cdot v_1 \|c_2 - p\|^2}{n \cdot v_2 \|c_1 - p\|^2}$$

where
- I1,2 denotes intensity measured at optical center c1 with source located at optical center c2;
- n·v1 denotes projection of the normal vector at point p in the direction of v1;
- $\|c_2-p\|$ denotes depth for optical center c2; and
- $\|c_1-p\|$ denotes depth for optical center c2.

22. The method of claim 20 wherein said predicting is in agreement with a BRDF associated with a point on said object corresponding to said selected point.

23. The method of claim 20 wherein said predicting is independent of a BRDF associated with a point on said object corresponding to said selected point.

24. The method of claim 20 wherein said predicting includes specularities in said reciprocal pair of images.

25. The method of claim 20 wherein said predicting includes leveraging effects of shadows and occlusions to enhance robustness of said predicting.

26. The method of claim 16 wherein said comparing includes determining an error based on a difference between a selected plurality of points on said estimated image and a selected plurality of corresponding points on said corresponding actual image.

27. The method of claim 16 wherein said refining includes dynamic programming.

28. The method of claim 16 wherein said refining includes a global nonlinear optimization algorithm.

29. The method of claim 16 wherein said refining further includes:
- establishing a parametric model; and
- updating parameters of said model to improve agreement between said estimated image and said corresponding actual image.

30. A computer-readable medium encoded with a machine-readable computer program code, said code including instructions which when executed in a computer system performs a method for image reconstruction, the method comprising:
- obtaining a single Helmholtz reciprocal pair of images of an object, said single Helmholtz reciprocal pair of images comprising a first image and a corresponding reciprocal image captured from at least one of a first receiver and a second receiver;
- determining a geometry associated with said obtaining;
- selecting a plurality of points in said first image and identifying corresponding candidate points in said corresponding reciprocal image;
- matching a selected point of said plurality of points and a candidate point of said corresponding candidate points.

31. A computer implemented system for image reconstruction comprising:
- a means for obtaining a single Helmholtz reciprocal pair of images of an object, said single Helmholtz reciprocal pair of images comprising a first image and a corresponding reciprocal image;
- a means for determining a geometry associated with said obtaining;

a means for selecting a plurality of points in said first image and identifying corresponding candidate points in said corresponding reciprocal image;

a means for matching a selected point of said plurality of points and a candidate point of said corresponding candidate points.

32. A computer-readable medium encoded with a machine-readable computer program code, said code including instructions which when executed in a computer system performs a method for image registration with an object, the method comprising:

obtaining a single Helmholtz reciprocal pair of images of an object, said Helmholtz reciprocal pair of images comprising a first image and a corresponding reciprocal image;

estimating a pose for said object;

predicting an estimated image corresponding to said pose and one image of said reciprocal pair of images;

comparing said estimated image with a corresponding actual image from said pair of images; and refining said estimating a pose based on said comparing.

33. A computer implemented system for image registration with an object comprising:

a means for obtaining a single Helmholtz reciprocal pair of images of an object, said Helmholtz reciprocal pair of images comprising a first image and a corresponding reciprocal image;

a means for estimating a pose for said object;

a means for predicting an estimated image corresponding to said pose and one image of said reciprocal pair of images;

a means for comparing said estimated image with a corresponding actual image from said pair of images; and a means for refining said estimating a pose based on said comparing.

* * * * *

UNITED STATES PATENT AND TRADEMARK OFFICE
CERTIFICATE OF CORRECTION

| | | |
|---|---|---|
| PATENT NO. | : 7,574,067 B2 | |
| APPLICATION NO. | : 10/678244 | |
| DATED | : August 11, 2009 | |
| INVENTOR(S) | : Tu et al. | |

It is certified that error appears in the above-identified patent and that said Letters Patent is hereby corrected as shown below:

On the Title Page 2, Item (56), under "OTHER PUBLICATIONS", Line 16, delete "Helnholtz" and insert -- Helmholtz --, therefor.

On the Title Page 2, Item (56)," under "OTHER PUBLICATIONS", Line 36, delete "Helmoholtz" and insert -- Helmholtz --, therefor.

On the Title Page 2, Item (56), under "OTHER PUBLICATIONS", Line 39, delete ""Helmoholtz" and insert -- "Helmholtz --, therefor.

In Column 14, Line 58, in Claim 6, delete "comparing:" and insert -- comparing; --, therefor.

In Column 15, Line 2, in Claim 7, delete "I1,2" and insert -- $I_{1,2}$ --, therefor.

In Column 15, Line 2, in Claim 7, delete "c1" and insert -- $c_1$ --, therefor.

In Column 15, Line 3, in Claim 7, delete "c2;" and insert -- $c_2$; --, therefor.

In Column 15, Line 4, in Claim 7, delete "n·v1" and insert -- n·$v_1$ --, therefor.

In Column 15, Line 5, in Claim 7, delete "v1;" and insert -- $v_1$; --, therefor.

In Column 15, Line 6, in Claim 7, delete "c2;" and insert -- $c_2$; --, therefor.

In Column 15, Line 7, in Claim 7, delete "c2." and insert -- $c_2$. --, therefor.

Signed and Sealed this
Twenty-first Day of June, 2011

David J. Kappos
*Director of the United States Patent and Trademark Office*

CERTIFICATE OF CORRECTION (continued)
U.S. Pat. No. 7,574,067 B2

In Column 16, Line 5, in Claim 21, delete " $I_{2,1} = I_{1,2} \dfrac{n \cdot v_1 \|c_2 - p\|^2}{n \cdot v_2 \|c_1 - p\|^2}$ " and insert -- $\hat{I}_{2,1} = I_{1,2} \dfrac{n \cdot v_1 \|c_2 - p\|^2}{n \cdot v_2 \|c_1 - p\|^2}$ --, therefor.

In Column 16, Line 10, in Claim 21, delete "I1,2" and insert -- $I_{1,2}$ --, therefor.

In Column 16, Line 10, in Claim 21, delete "c1" and insert -- $c_1$ --, therefor.

In Column 16, Line 11, in Claim 21, delete "c2;" and insert -- $c_2$; --, therefor.

In Column 16, Line 12, in Claim 21, delete "n·v1" and insert -- $n \cdot v_1$ --, therefor.

In Column 16, Line 13, in Claim 21, delete "v1;" and insert -- $v_1$; --, therefor.

In Column 16, Line 14, in Claim 21, delete "c2." and insert -- $c_2$; --, therefor.

In Column 16, Line 15, in Claim 21, delete "c2." and insert -- $c_2$. --, therefor.